United States Patent [19]

Novikov et al.

[11] 4,101,065
[45] Jul. 18, 1978

[54] METHOD OF MANUFACTURING MULTILAYER CONVEX COLLARED COVERS AND BOTTOMS FOR PRESSURE VESSELS

[76] Inventors: Alexandr Nikolaevich Novikov, ulitsa Kurchatova, 9, kv. 41; Evdokia Danilovna Kudrikova, ulitsa Sovetskaya, 160, kv. 7; Marat Moiseevich Shel, ulitsa Kievskaya, 4, kv. 15; Pavel Gdalievich Pimshtein, ulitsa Kurchatova, 9, kv. 45, all of Irkutsk; Nikolai Kirillovich Globin, ulitsa Griboedova, 20, kv. 64, Sverdlovsk; Boris Georgievich Ziselman, ulitsa Inzhenernaya, 71, kv. 45, Sverdlovsk; Vyacheslav Mikhailovich Potulov, ulitsa Griboedova, 19, kv. 14, Sverdlovsk; Alexei Mikhailovich Maletin, deceased, late of Irkutsk; by Ljubov Alexeevna Maletin, administrator; by Tatyana Alexeevna Maletina, administrator, both of ulitsa Kurchatova, 56, kv. 41, Irkutsk, all of U.S.S.R.

[21] Appl. No.: 743,063
[22] Filed: Nov. 18, 1976
[51] Int. Cl.$^2$ ............................................. B23K 31/02
[52] U.S. Cl. ................................... 228/155; 228/184; 228/190

[58] Field of Search ............... 228/155, 184, 185, 179, 228/190; 72/342, 364, DIG. 13; 220/3, 63, 378, 327

[56] References Cited

U.S. PATENT DOCUMENTS

| 2,652,943 | 9/1953 | Williams | 220/378 X |
| 3,041,717 | 7/1962 | Brown | 220/3 X |

Primary Examiner—Donald G. Kelly
Attorney, Agent, or Firm—Haseltine, Lake & Waters

[57] ABSTRACT

A method of manufacturing multilayer convex collared covers and bottoms for pressure vessels by assembling a pack of circular sheet blanks in the form of a truncated cone through the placement of one blank on another. The diameter of the upper smaller blank is equal to the developed length of the inner layer of the cover or bottom, the diameter of each subsequent blank being selected so that the base angle of the truncated cone would be 40°-65°. The blanks are then in assembled pack form welded to one another along their perimeter and stamped at a temperature of 800°-1100° C. Thereafter the stamped product is machined. The cover manufactured by this method has one ring at the external side and one ring at the internal side; the rings are welded at the flat side. The ring located on the internal side of the collar is provided with a circular sealing groove.

3 Claims, 8 Drawing Figures

METHOD OF MANUFACTURING MULTILAYER CONVEX COLLARED COVERS AND BOTTOMS FOR PRESSURE VESSELS

BACKGROUND OF THE INVENTION

The present invention relates to high-pressure equipment and more particularly to a method of manufacturing multilayer convex collared covers and bottoms for pressure vessels.

The present invention can be used in designing the high-pressure equipment in, say, chemical and petrochemical industries.

Moreover, the present invention can be most efficiently used in building large pressure vessels for internal pressures above 100 kgf/cm$^2$.

Initially, multilayer pressure vessels consisted in part of several layers, namely, only their cylindrical portion consisted of such several layers, while the end portions, i.e. the bottom and the cover, were of a solid construction, e.g. forged.

Such forged covers and bottoms are expensive and their manufacture involves a large amount of labour. Their production calls for a large amount of machining and results in heavy waste of metal. Production of forged covers and bottoms additionally requires complicated metallurgical and forging equipment. Lastly, it is difficult to attain high mechanical properties of metal in thick forgings.

All this taken together tends to raise the cost of pressure vessels and impairs their reliability.

The solid bottom is primarily made by hot stamping it from thick sheets on powerful presses, whereas, the solid covers are made from forgings.

Small-diameter vessels are provided with flat covers whose thickness may reach high limits depending on pressure. However, the large-diameter vessels are made with convex collared covers, and such covers are usually of two parts, namely, a flange, in the form of a solid ring and a solid hemisphere, welded to the flange. The hemisphere is hot stamped from thick metal sheets.

Known in the previous art is a method of making flanged covers from a single sheet (a forging). This method utilizes stamping combined with clamping.

However, the production of a solid bottom from a thick sheet and a cover forging such material is extremely labourous consuming and involves the use of complicated equipment.

Therefore, the manufacture of covers and bottoms by forging solid material for large pressure vessels is quite difficult.

This has posed a problem of making multilayer flanged covers and bottoms for pressure vessels.

There is known a method of making multilayer bottoms for pressure vessels wherein the bottom is made from individual sheet blanks. In this method, the first stage consists in stamping the first inner layer of the bottom in a known manner while the metal is hot after which this layer is used as a punch holder and the second, third, etc. layers are stamped until the required thickness of the bottom is attained.

After stamping each subsequent layer, either the die or its inserted rings are changed. The size of each subsequent ring of the die should correspond to the diameter of the bottom layer. This method does not require complex stamping equipment and is adaptable in making the bottom from thin sheets.

The utilization of this method, however, in making large-diameter thick bottoms requires the use of a set of dies o replaceable die rings.

In the course of heating and stamping, each sheet becomes covered with a layer of scale which remains between the layers, thus increasing the interlayer clearances and impairing the reliability of the bottom. Besides, the bottom manufacturing process is complicated by a multitude of successive stamping operations.

Known in the art is a method of manufacturing multilayer convex collared covers and bottom for pressure vessels which consists of stamping the cover or bottom from a pack of circular sheet blanks in a known manner while the metal is cold. The pack is assembled by placing one blank on another to form a truncated cone. The diameter of the upper smaller blank is equal to the developed length of the inner layer of the bottom or cover. The pack in the form of a truncated cone is placed on a die and clamped by a hold-down device. In the course of stamping, the pack is drawn to the shape of the punch.

This method produce makes it possible to the bottom or cover of a higher quality than previously described methods, decreases the interlayer clearances and reduces the amount of labour required.

However, the necessity for using the hold-down device in the course of stamping, increases the force of the press by 50% as compared with the previously described method.

In manufacturing the large-diameter thick multilayer steel bottoms and covers, stamping must be followed by heat treatment for relieving the internal stresses and ensuring the preset plastic properties of metal.

Heat treatment increases the interlayer clearances; as a result, air penetrates into these clearances and scale is formed therein, thereby worsening the finished product.

Furthermore stamping of covers and bottoms for large-diameter thick pressure vessels according to the above known method (where the metal being stamped is cold) involves the employment of powerful presses since the yield point of metal in a cold state is much higher than that of hot metal.

SUMMARY OF THE INVENTION

The main object of the present invention is to provide a method of manufacturing multilayer convex collared covers and bottoms for pressure vessels, and a cover manufactured by the method which would improve the quality and reliability of the manufactured covers and bottoms as compared with the similar known methods of manufacturing.

Another object of the invention is to provide a method of manufacturing multilayer convex collared covers and bottoms for pressure vessels, and a cover manufactured by the method, which would increase the stiffness of the covers as compared with the similar known methods of manufacturing.

Still another object of the present invention is to provide a method for manufacturing a cover by the above method which would reduce the power of the stamping equipment as compared with the similar known methods of manufacturing.

This and other objects are accomplished by providing a method of manufacturing multilayer convex collared covers and bottoms for pressure vessels comprising assembling a pack in the form of a truncated cone from circular sheet blanks by placing one blank on the other, the diameter of the upper smaller blank being equal to the developed length of the inner layer of the cover or bottom, stamping of said pack is followed by surface preparation for further welding wherein, according to the invention, the diameter of each subsequent blank is selected so that the base angle of the truncated cone would be equal to 40°-65°; then the blanks in the assembled pack are welded to one another along their perimeter and stamped at a temperature of 800°-1110° C.

This object is also accomplished by providing the collar of the cover made by said the above method with one ring, respectively on the outer and inner sides, the rings being welded at the flat side; the ring located on the inner side of the collar is provided with a circular sealing groove.

The cover made by the method according to the invention can be used in large pressure vessels for internal pressures exceeding 100 kgf/cm$^2$.

Since the blanks in the assembled pack are welded to one another along their perimeter, there are no corrugations caused by stamping and no scale is formed during heating; consequently, this improves the quality and reliability of the covers and bottoms for pressure vessels.

Owing to the fact that the base angle of the truncated cone, according to the invention, is equal to 40°-65°, waste of metal during the manufacture of covers and bottoms for pressure vessels is reduced.

Since stamping, according to the invention, is carried out at temperatures varying from 800° to 1100° C, the power requirements of the stamping equipment used is reduced.

It is practicable that the circular sheet blanks should be welded to one another along their perimeter by an intermittent seam, the intervals between the welding spots being equispaced around the circumference and the size of the gaps in each weld being equal to 0.3-0.8% of the blank circumference.

In the course of stamping, the gaps between the welding spots serve for the discharge of air remaining between the sheet blanks.

The possibility of free discharge of air ensures high quality of stamping and assists in a maximum reduction of clearances between the layers of the finished articles.

It is desirable that the circular sheet blanks should be welded to one another along their perimeter by a continuous seam and that each welding seam should have holes drilled uniformly around the entire circumference of the blank, the total size of these holes for each seam being equal to 0.3-0.8% of the blank circumference. This is necessary when using automatic welding.

It is practicable that at least one more ring should be welded to the ring located at the external side of the collar. This will increase the rigidity of the cover collar.

It is also desirable that at least one circular part be adapted to compensate for the distortion of the cover and should be placed between the collar and the ring with the sealing groove. This will reduce the concentration of stresses at the point of transition from the collar to the spherical part of the cover. These stresses being originated by the internal pressure in the vessel.

The use of the present invention improves the quality and reliability of the covers and bottoms for pressure vessels as compared with the covers and bottoms manufactured by the similar known methods.

The use of the present invention reduces the waste of metal in manufacturing the covers and bottoms for pressure vessels as compared with the similar known methods.

Furthermore, the utilization of the present invention reduces the power of the stamping equipment as compared with the equipment employed in the similar known methods.

Now the invention will be described in detail by way of example with reference to the accompanying drawings, in which:

IN THE DRAWINGS

PREFERRED EMBODIMENT

Figure 1:
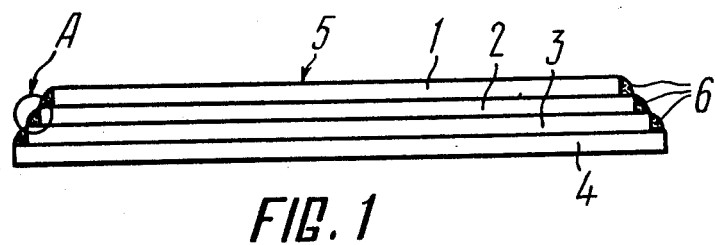
FIG. 1 shows an assembled pack of circular sheet blanks.

The method of manufacturing multilayer convex collared covers for pressure vessels is as follows. Circular sheet blanks 1,2,3 and 4 (FIG. 1) are assembled into a pack 5 in the form of a truncated cone whose base angle is equal to 40°-65°. The diameter of the upper smaller blank 1 is equal to the developed length of the inner layer of the bottom or cover.

Figure 2:
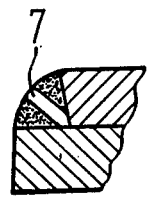
FIG. 2 shows fragment A in FIG. 1, enlarged.

Then the blanks in the assembled pack 5 are welded to one another along their perimeter by a continuous seam 6 and holes 7 (FIG. 2) are drilled in each welding seam uniformly around the entire blank circumference, the total size of these holes in each seam being equal to 0.3-0.8% of the blank circumference.

In this particular example, the blanks are welded to one another by a continuous seam with drilled holes; however, the circular sheet blank can be welded by an intermittent seam, the intervals between the welding spots being equispaced around the blank circumference. The size of these intervals for each seam should be equal to 0.3-0.8% of the circumference.

Figure 3:
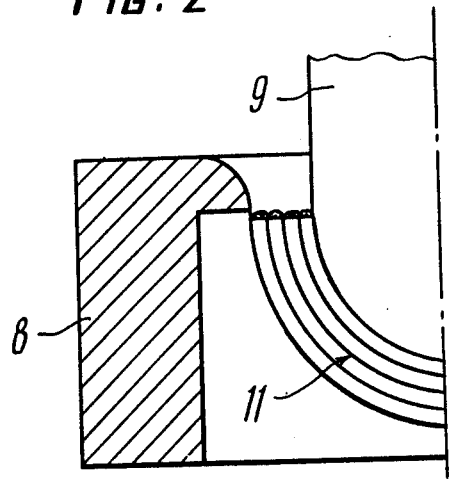
FIG. 3 is a section of a part of a multilayer bottom according to the invention by the process of stamping.
Figure 4:
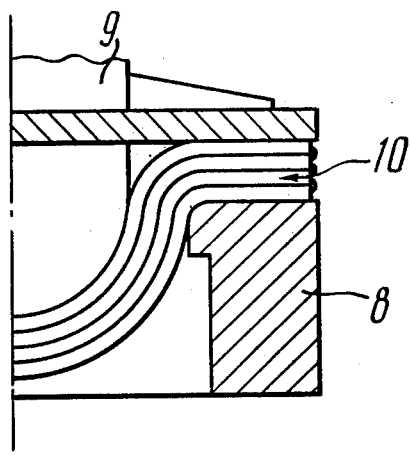
FIG. 4 is a section of a part of a multilayer collar cover according to the invention by the process of stamping.

Then the pack 5 (FIG. 1) is heated by well known means to 800°-1100° C and placed on the die 8 (FIGS. 3 and 4) of the stamp (not shown in the drawing). Then the cover with the collar 10 or the bottom 11 is positioned in place by well known hold down means and stamped with the aid of the punch 9 in a conventional manner.

Next, the ends of the cover with the collar 10 or those of the bottom 11 are machined by conventional means to enable further welding to subsequently take place at the ends.

The covers with the collars 10 are used with pressure vessels built for internal pressures up to 100 kgf/cm².

Figure 5:
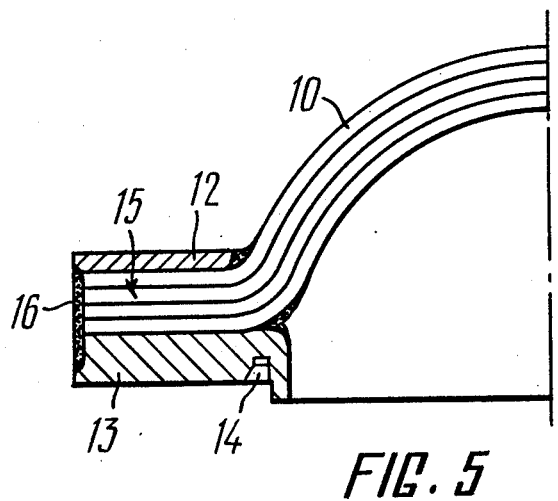
FIG. 5 is a section of a part of a pressure vessel cover, according to the invention, the outer and inner sides of the collar provided with one ring each.

If the collared covers are used with large pressure vessels designed for interval pressures above 100 kgf/cm², the external collar of the cover 10 (FIG. 5) has one ring 12 welded at its flat side.

Welded to the inner side of the collared cover 10 is a ring 13 with a circular sealing groove 14.

During assembly of the pressure vessel (not shown in the drawing) this groove 14 receives a sealing ring intended to make the vessel pressuretight.

The stiffness of the flange 15 formed by the cover collar 10 and the rings 12 and 13 is increased by covering it with filler metal 16.

Figure 6:
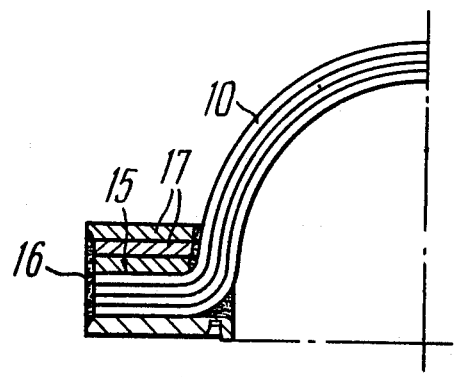
FIG. 6 is a section of a part of a pressure vessel cover with two more rings welded, according to the invention, to the ring located at the external side of the collar.

In the example considered here, the external side of the cover collar 10 has one welded ring 12; however, in order to increase the stiffness of the flange 15 (FIG. 6) two, three, four and more rings 17 can be welded to the external side of the collar.

Figure 7:
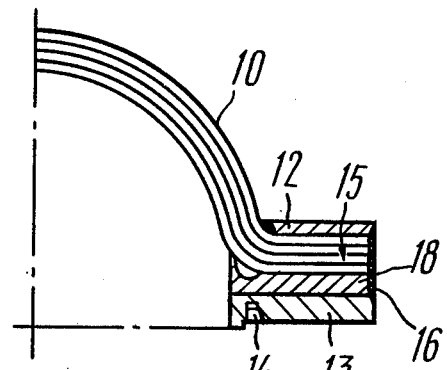
FIG. 7 is a section of a part of a pressure vessel cover which, according to the invention, is provided with one circular part adapted for compensating for cover distortion being located between the collar and the ring with the sealing groove.
Figure 8:
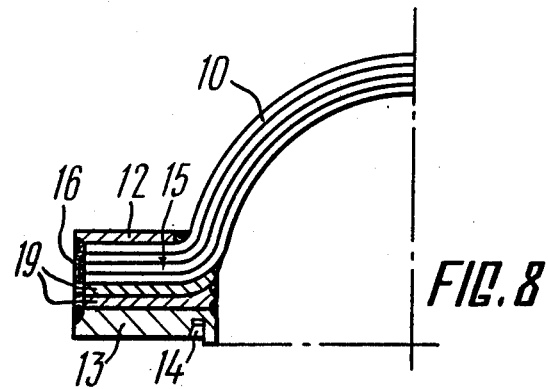
FIG. 8 is a section of a part of a pressure vessel cover in which, according to the invention, there are two circular parts adapted to compensate for cover distortion, being located between the collar and the ring with the sealing groove.

To reduce the concentration of stresses arising at the point of transition from the collar to the spherical part of the cover under the effect of the internal pressure in the vessel a circular part 18 (FIG. 7) is placed between the cover collar 10 (FIGS. 7 and 8) and the ring 13 with the sealing groove 14; this circular part is adapted to make up for the distortion of the cover 10; the same purpose can be served by two circular parts 19 (FIG. 8).

In the example considered here one or two circular parts are placed between the cover collar and the ring with the sealing groove; however, to improve compensation for the distortion of the cover it is possible to place three, four and more circular parts between the cover collar and the ring with the sealing groove.

EXAMPLE

The multilayer bottom for a pressure vessel with an inside diameter of 2400 mm and a thickness of 260 mm is made of four circular sheet blanks which are assembled into a pack in the form of a truncated cone.

The diameter of the upper smaller blank is 3700 mm and the diameters of the subsequent blanks are selected so that the base angle of the truncated cone would be 50°.

The circular sheet blanks are welded to one another along their perimeter with an intermittent seam.

During welding, four intervals, each 12-15 mm long, are left in each welding seam, spacing these intervals at 90° around the blank circumference.

The multilayer pack produced in this manner is heated to 1100° C by conventional means, placed into the stamp die while still hot, and stamped.

After stamping, the pack takes the form of an elliptical bottom of preset dimensions.

The stamped bottom is machined along the end faces to prepare such faces for welding of the bottom to the cylindrical portion of the pressure vessel.

The manufactured vessel with the multilayer bottom was hydraulically tested under a pressure considerably higher than the rated working pressure.

The multilayer bottom and the vessel as a whole have successfully passed the test. The vessel bottom of the multilayer type proved to possess higher mechanical properties than the solid ones, to be more reliable and its manufacturing cost was 15-20% lower.

What we claim is:

1. A method of manufacturing multilayer convex collared covers and bottoms for pressure vessels including the steps of: assembling a pack of circular sheet blanks in the form of a truncated cone by placing one blank on another; forming said cone where the diameter of the upper smaller blank is equal to the developed length of the internal layer of the bottom; selecting the diameter of each subsequent blank so that the base angle of the truncated cone is equal to from 40°-65°; and welding said pack blanks one to another along their perimeter; stamping said blanks at a temperature of 800°-1100° C and preparing said blanks for further welding at surfaces to be subsequently welded.

2. A method according to claim 1, including the steps of: welding said circular sheet blanks one to another along their perimeter by an intermittent seam at equi-spaced intervals between welding spots around said blank circumference, said intervals for each seam being equal to 0.3-0.8% of said blank circumference.

3. A method according to claim 1, including the steps of: welding said circular sheets blanks to one another along their perimeter by a continuous seam, said seam having holes formed around said blank circumference and the total size of said holes for said seam being equal to 0.3-0.8% of the blank circumference.

* * * * *